(12) United States Patent
Lim et al.

(10) Patent No.: US 11,035,527 B1
(45) Date of Patent: Jun. 15, 2021

(54) TROFFER LIGHT FIXTURE

(71) Applicant: IDEAL Industries Lighting LLC, Durham, NC (US)

(72) Inventors: Jin Hong Lim, Morrisville, NC (US); Mark Boomgaarden, Cary, NC (US); Randall Levy Bernard, Durham, NC (US)

(73) Assignee: IDEAL Industries Lighting LLC, Racine, WI (US)

( * ) Notice: Subject to any disclaimer, the term of this patent is extended or adjusted under 35 U.S.C. 154(b) by 0 days.

(21) Appl. No.: 16/937,096

(22) Filed: Jul. 23, 2020

(51) Int. Cl.
| | |
|---|---|
| *F21V 29/00* | (2015.01) |
| *F21K 9/61* | (2016.01) |
| *F21K 9/68* | (2016.01) |
| *F21V 7/00* | (2006.01) |
| *F21Y 101/00* | (2016.01) |
| *F21Y 115/10* | (2016.01) |
| *F21Y 103/10* | (2016.01) |

(52) U.S. Cl.
CPC .................. *F21K 9/61* (2016.08); *F21K 9/68* (2016.08); *F21V 7/005* (2013.01); *F21V 7/0091* (2013.01); *F21Y 2101/00* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 5,384,693 | A | 1/1995 | Schwaller et al. |
| 7,874,697 | B2 | 1/2011 | Biebel et al. |
| 8,310,143 | B2 | 11/2012 | Van De Ven et al. |
| 8,736,186 | B2 | 5/2014 | Chobot |
| 8,829,821 | B2 | 9/2014 | Chobot et al. |
| 8,912,735 | B2 | 12/2014 | Chobot et al. |
| 8,975,827 | B2 | 3/2015 | Chobot et al. |
| 9,155,165 | B2 | 10/2015 | Chobot |
| 9,155,166 | B2 | 10/2015 | Chobot |
| 9,433,061 | B2 | 8/2016 | Chobot |
| 9,572,226 | B2 | 2/2017 | Motley |
| 9,622,321 | B2 | 4/2017 | Creasman et al. |
| 9,786,639 | B2 | 10/2017 | Bergmann et al. |
| 9,900,957 | B2 | 2/2018 | Van de Ven et al. |
| 10,161,612 | B2 | 12/2018 | Chobot et al. |
| 10,203,088 | B2 | 2/2019 | Lay et al. |
| 10,247,372 | B2 | 4/2019 | Wilcox et al. |

(Continued)

OTHER PUBLICATIONS

Cree Lighting, "Cree FLEX Series LED Spec-Grade Troffer Sales Sheet", Jan. 10, 2019, pp. 1-2, obtained from Internet: https://www.creelighting.com/Coveo_Rest/searchresults/indexall?searchCollection=%40syscollection%3DLighting&q=troffer#q=troffer&sort=relevancy.

(Continued)

*Primary Examiner* — Elmito Breval
(74) *Attorney, Agent, or Firm* — Withrow & Terranova, P.L.L.C.

(57) ABSTRACT

A light fixture with a troffer design. One light fixture includes light guide plates that extend above a back pan of the housing. LED assemblies are connected to light guide plates and direct light into the light guide plates through one of the outer edges. Each of the light guide plates receive the (Continued)

light through the outer edge and directs the light outward from the outer surface. Another light fixture includes a back pan, first and second light panels that are positioned above and spaced away from the back pan. Pixels are mounted on the outer surface of the light panels with each of the pixels configured to emit light.

23 Claims, 14 Drawing Sheets

(56) References Cited

U.S. PATENT DOCUMENTS

| | | | |
|---|---|---|---|
| 10,278,250 | B2 | 4/2019 | McBryde et al. |
| 10,412,809 | B2 | 9/2019 | Van de Ven |
| 10,451,229 | B2 | 10/2019 | Keller et al. |
| 10,465,869 | B2 | 11/2019 | Keller et al. |
| 10,502,374 | B2 | 12/2019 | Leung et al. |
| 10,508,794 | B2 | 12/2019 | Lim et al. |
| 10,527,785 | B2 | 1/2020 | Tarsa et al. |
| 10,529,900 | B2 | 1/2020 | Zhang et al. |
| 2008/0278943 | A1 | 11/2008 | Van Der Poel |
| 2011/0222279 | A1 | 9/2011 | Kim et al. |
| 2012/0299017 | A1 | 11/2012 | Chen et al. |
| 2013/0258245 | A1 | 10/2013 | Fang |
| 2014/0268790 | A1 | 9/2014 | Chobot et al. |
| 2014/0347885 | A1 | 11/2014 | Wilcox et al. |
| 2016/0061413 | A1 | 3/2016 | Hedberg, Jr. |
| 2016/0305619 | A1 | 10/2016 | Howe |
| 2018/0172246 | A1 | 6/2018 | Walker et al. |
| 2020/0088387 | A1 | 3/2020 | Lim et al. |

OTHER PUBLICATIONS

Cree Lighting, "ZR Series Troffer Sales Sheet", Jun. 5, 2017, pp. 1-2, obtained from Internet: https://www.creelighting.com/Coveo_Rest/searchresults/indexall?searchCollection=%40syscollection%3DLighting&q=troffer#q=troffer&sort=relevancy.

Cree Lighting, "FLEX Series Spec-Grade Troffer sales sheet", Jan. 10, 2019, pp. 1-4, obtained from Internet: https://www.creelighting.com/Coveo_Rest/searchresults/indexall?searchCollection=%40syscollection%3DLighting&q=troffer#q=troffer&sort=relevancy.

Cree Lighting, "C-Lite® C-TR-A-BT24 Series LED Basket Troffer 2'×4' Spec Sheet", Jun. 8, 2020, pp. 1-3, obtained from Internet: https://www.creelighting.com/Coveo_Rest/searchresults/indexall?searchCollection=%40syscollection%3DLighting&q=troffer#q=troffer&sort=relevancy.

Cree Lighting, "Surface Mount Kit Installation Instructions for CR Troffers", Jan. 10, 2020, pp. 1-2, obtained from Internet: https://www.creelighting.com/Coveo_Rest/searchresults/indexall?searchCollection=%40syscollection%3DLighting&q=troffer#q=troffer&sort=relevancy.

Natural Resources Canada, "Lighting for Health and Energy Savings", The Lighting Energy Alliance and Light and Health Alliance at the Lighting Research Center, Mar. 1, 2019, pp. 1-7, Rensselaer Polytechnic Institute.

U.S. Appl. No. 61/932,058, filed Jan. 27, 2014.

U.S. Appl. No. 62/292,528, filed Feb. 8, 2016.

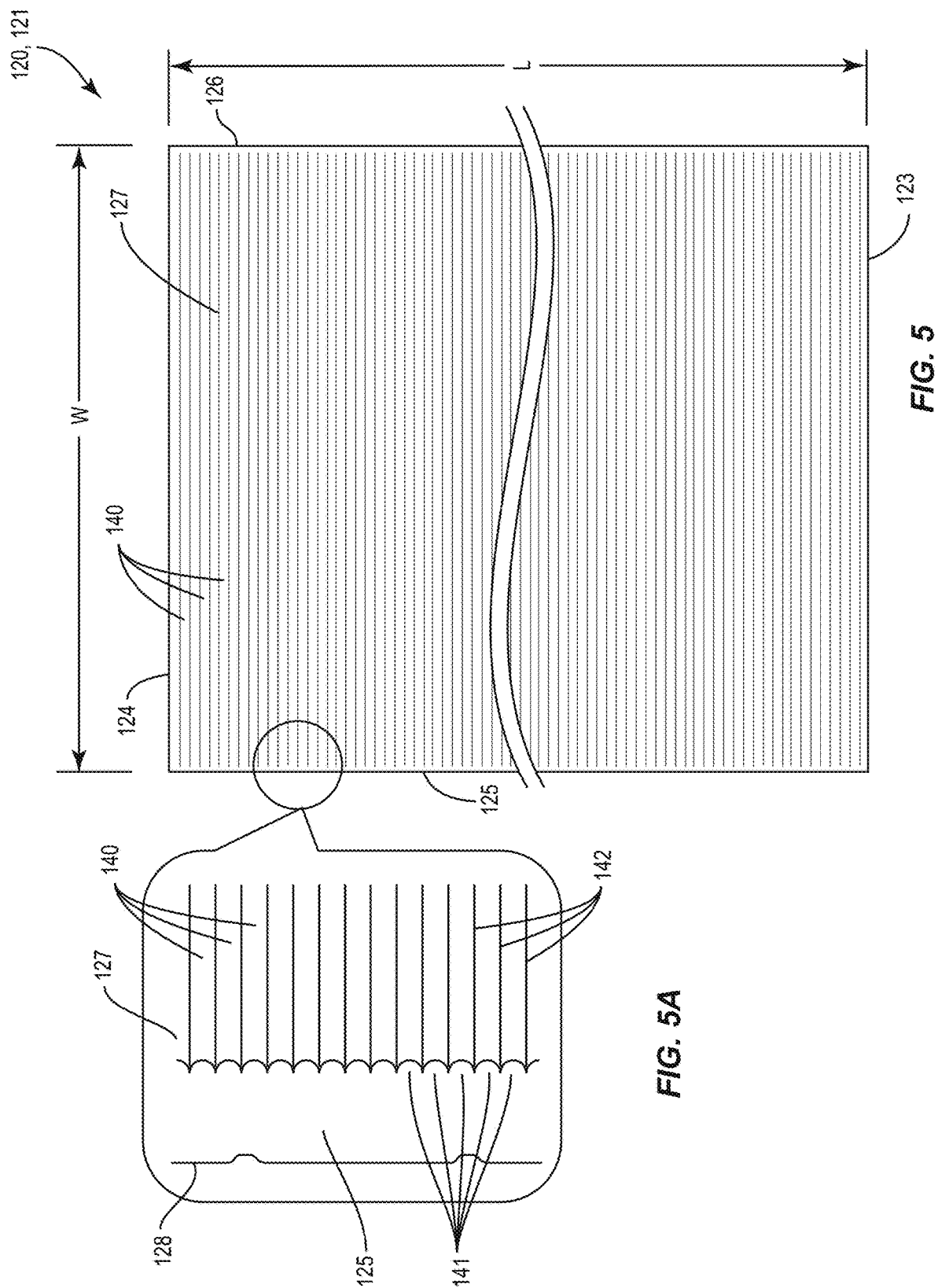

TROFFER LIGHT FIXTURE

FIELD OF THE INVENTION

The invention relates to light fixtures and, more particularly, to troffer style light fixtures.

BACKGROUND

Troffer light fixtures are ubiquitous in residential, commercial, office and industrial spaces throughout the world. In many instances these troffer light fixtures house elongated fluorescent light bulbs that span the length. Troffer light fixtures can be used in a wide variety of manners, including but not limited to being mounted to or suspended from ceilings, and recessed into the ceiling with the back side protruding into the plenum area above the ceiling. Elements on the back side of the troffer light fixture may dissipate heat generated by the light source into the plenum where air can be circulated to facilitate the cooling mechanism.

More recently, with the advent of efficient solid state lighting sources, these troffer light fixtures have been used with LEDs. LEDs have certain characteristics that make them desirable for many lighting applications that were previously the realm of incandescent or fluorescent lights. LEDs can emit the same luminous flux as incandescent and fluorescent lights using a fraction of the energy. In addition, LEDs can have a significantly longer operational lifetime.

BRIEF SUMMARY

Embodiments of the present disclosure generally relate to light fixtures. One aspect is directed to a light fixture comprising a back pan. A light guide assembly is spaced away from and positioned over the back pan. The light guide assembly comprises first and second light guide plates that each include outer edges, an outer face that faces away from the back pan, and an inner face that faces towards the back pan. The first and second light guide plates are connected together along the outer edges. A first LED assembly extends along one of the outer edges of the first light guide plate and a second LED assembly that extends along one of the outer edges of the second light guide plate. Each of the first and second LED assemblies comprises LED elements that are aligned in an elongated array to emit light into the respective first and second light guide plates. Each of the first and second light guide plates is configured to receive the light through the outer edge and to direct the light outward from the outer surface and away from the back pan.

In another aspect, the inner faces of the first and second light guide plates each comprise an array of dips having an elongated shape with a major axis that is perpendicular to the respective first and second LED assemblies and a minor axis that is parallel with the respective first and second LED assembly.

In another aspect, each of the inner faces further comprise a planar surface with the dips extending into the planar surface.

In another aspect, the outer faces of the first and second light guide plates each comprise elongated features that extend a length and are perpendicular to the respective first and second LED assemblies.

In another aspect, the elongated features comprise ridges that each has a semi-spherical shape.

In another aspect, the inner faces of the first and second light guide plates each comprise first features that cause diffuse reflection of the light and second features that cause specular reflection of the light.

In another aspect, the LED assemblies are attached to first ones of the outer edges of the respective first and second light guide plates, and opposing second outer edges of the respective first and second light guide plates each comprise a reflector that reflects at least a portion of the light.

In another aspect, the inner faces of the first and second light guide plates are configured for total internal reflection of the light.

In another aspect, a connector connects together inner the first and second light guide plates with the connector comprising a body with slots that receives the outer edges of the first and second light guide plates and with the connector positioned along a center line of the back pan.

In another aspect, a diffuser film is positioned on the outer faces of the first and second light guide plates and a diffuser reflector is positioned on the inner faces of the first and second light guide plates.

In another aspect, the light fixture comprises a symmetrical shape about a center line of the light fixture.

One aspect is directed to a light fixture comprising a concave back pan. First and second light guide plates each include inner sides that are connected together and opposing outer sides that contact against opposing sections of the back pan. The first and second light guide plates further comprise an outer face that faces away from the back pan and an inner face that faces towards the back pan. A first LED assembly is connected to the inner side of the first light guide plate and configured to direct light into the first light guide plate through the inner side. A second LED assembly is connected to the inner side of the second light guide plate and configured to direct light into the second light guide plate through the inner side. Each of the first and second light guide plates is configured to receive the light through the inner side and to direct the light outward from the outer face.

In another aspect, each of the first and second LED assemblies comprises LED elements that are aligned in an elongated array that extends a length of the inner side of the respective first and second light guide plates.

In another aspect, the inner face of each of the first and second light guide plates is configured for total internal reflection of the light.

In another aspect, the inner face of each of the first and second light guide plates comprises a planar face with an array of dips that extend into the planar face.

In another aspect, each of the dips comprises an elongated shape with a major axis that is perpendicular to the respective first and second LED assemblies.

In another aspect, each of the outer sides of the first and second light guide plates comprises a reflector that reflects at least a portion of the light back into the respective light guide plate.

In another aspect, a connector connects together the inner sides of each of the first and second light guide plates and wherein the connector further supports the first and second LED assemblies.

In another aspect, a reflector is positioned on the inner faces of the first and second light guide plates.

In another aspect, a diffuser is positioned on the outer faces of the first and second light guide plates.

One aspect is directed to a light fixture comprising a housing comprising a concave back pan. First and second light panels are connected together along outer edges and are positioned above and spaced away from the back pan. The first and second light panels further comprise an outer face that faces away from the back pan and an inner face that faces towards the back pan. Pixels that extend across the outer faces of each of the first and second light panels with each of the pixels configured to emit light.

In another aspect, each pixel comprises three sub-pixels that include a red sub-pixel, a blue sub-pixel, and a green sub-pixel.

In another aspect, each pixel comprises a single pixel configuration to provide uniform lighting with a single white color.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

FIG. 5 is a top view of a light guide plate.

FIG. 5A is a schematic view of the light guide plate of FIG. 5.

DETAILED DESCRIPTION

Figure 1:
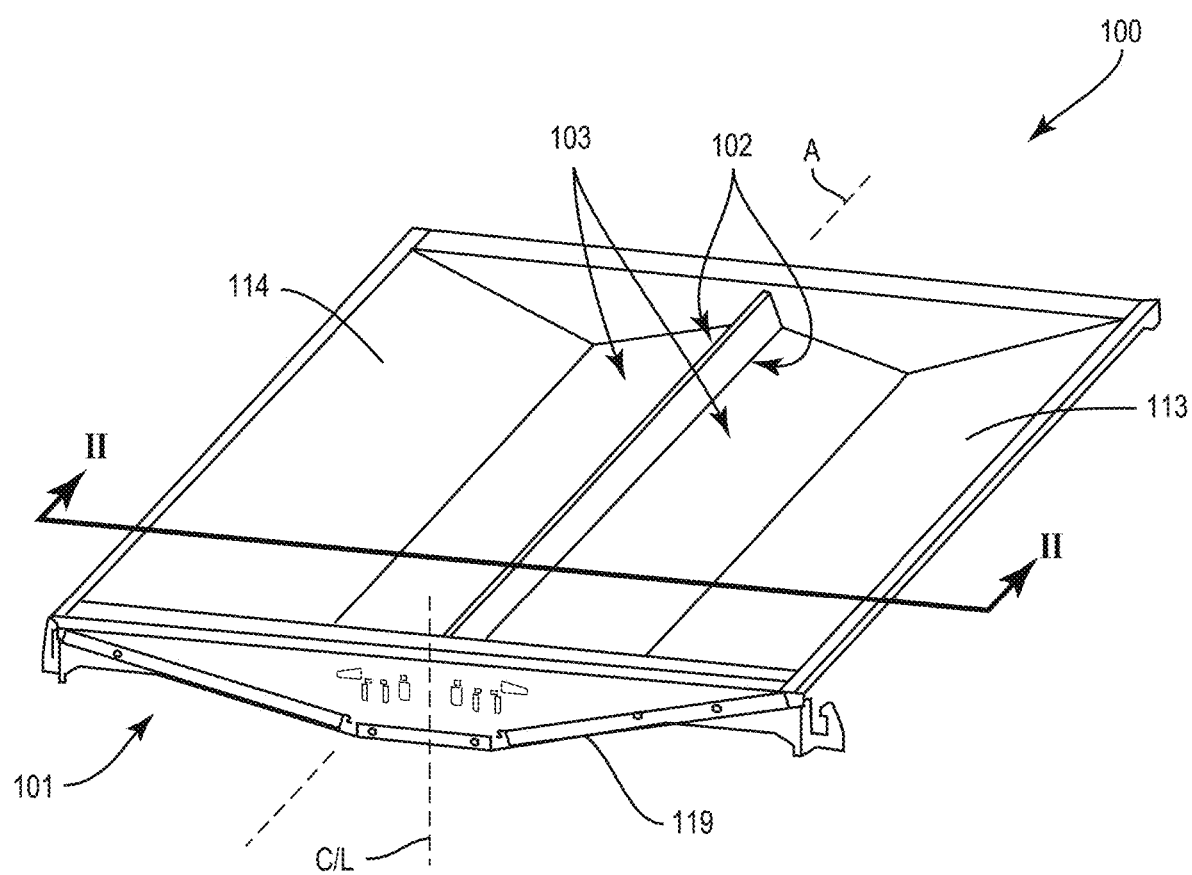
FIG. 1 is a perspective view of a light fixture.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output.

The expression "correlated color temperature" ("CCT") is used according to its well-known meaning to refer to the temperature of a blackbody that is nearest in color, in a well-defined sense (i.e., can be readily and precisely determined by those skilled in the art). Persons of skill in the art are familiar with correlated color temperatures, and with Chromaticity diagrams that show color points to correspond to specific correlated color temperatures and areas on the diagrams that correspond to specific ranges of correlated color temperatures. Light can be referred to as having a correlated color temperature even if the color point of the light is on the blackbody locus (i.e., its correlated color temperature would be equal to its color temperature); that is, reference herein to light as having a correlated color temperature does not exclude light having a color point on the blackbody locus.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

Figure 2:
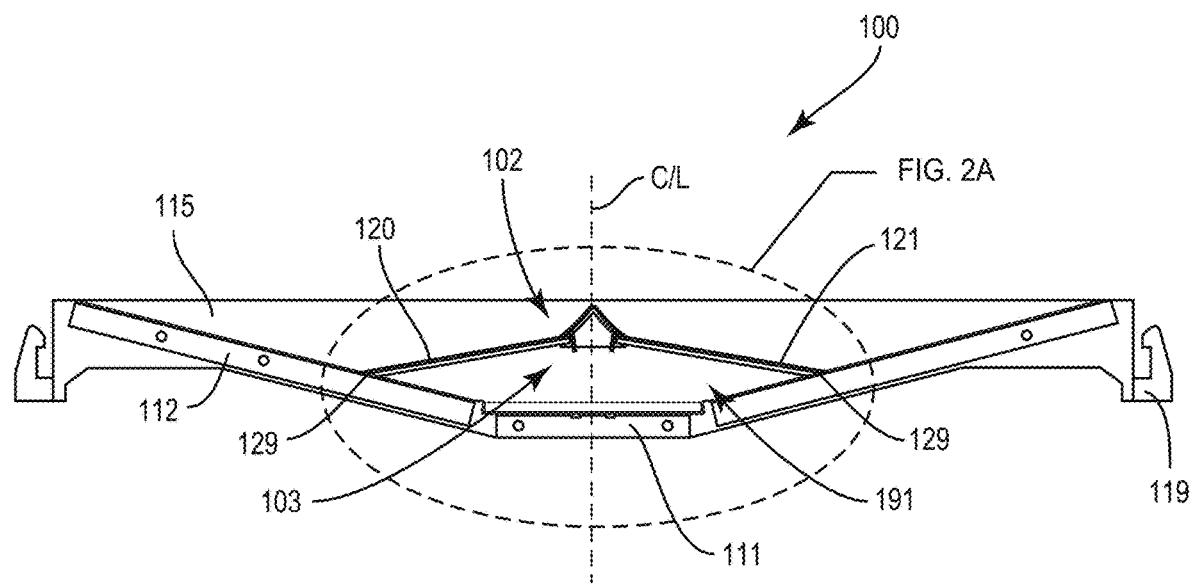
FIG. 2 is a side schematic view of a light fixture having a housing, LED assembly, and light guide assembly.

FIGS. 1 and 2 illustrate a troffer light fixture 100 (hereinafter light fixture). The light fixture 100 generally includes a housing 101, a LED assembly 102, and a light guide assembly 103.

The housing 101 extends around the exterior of the light fixture 100 and is configured to mount of otherwise be attached to a support. The light fixture 100 includes a longitudinal axis A that extends along the length. A width is measured perpendicular to the longitudinal axis A. A centerline C/L extends through the light fixture 100. The light fixture may be provided in many sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 100 may have different dimensions and can be customized to fit most any desired fixture dimension.

FIG. 1 illustrates the light fixture 100 in an inverted configuration. In some examples, the light fixture 100 is mounted on a ceiling or other elevated position to direct light vertically downward onto the target area. The light fixture 100 may be mounted within a T grid by being placed on the supports of the T grid. In other examples, additional attachments, such as tethers, may be included to stabilize the fixture in case of earthquakes or other disturbances. In other embodiments, the light fixture 100 may be suspended by cables, recessed into a ceiling or mounted on another support structure.

Figure 3:
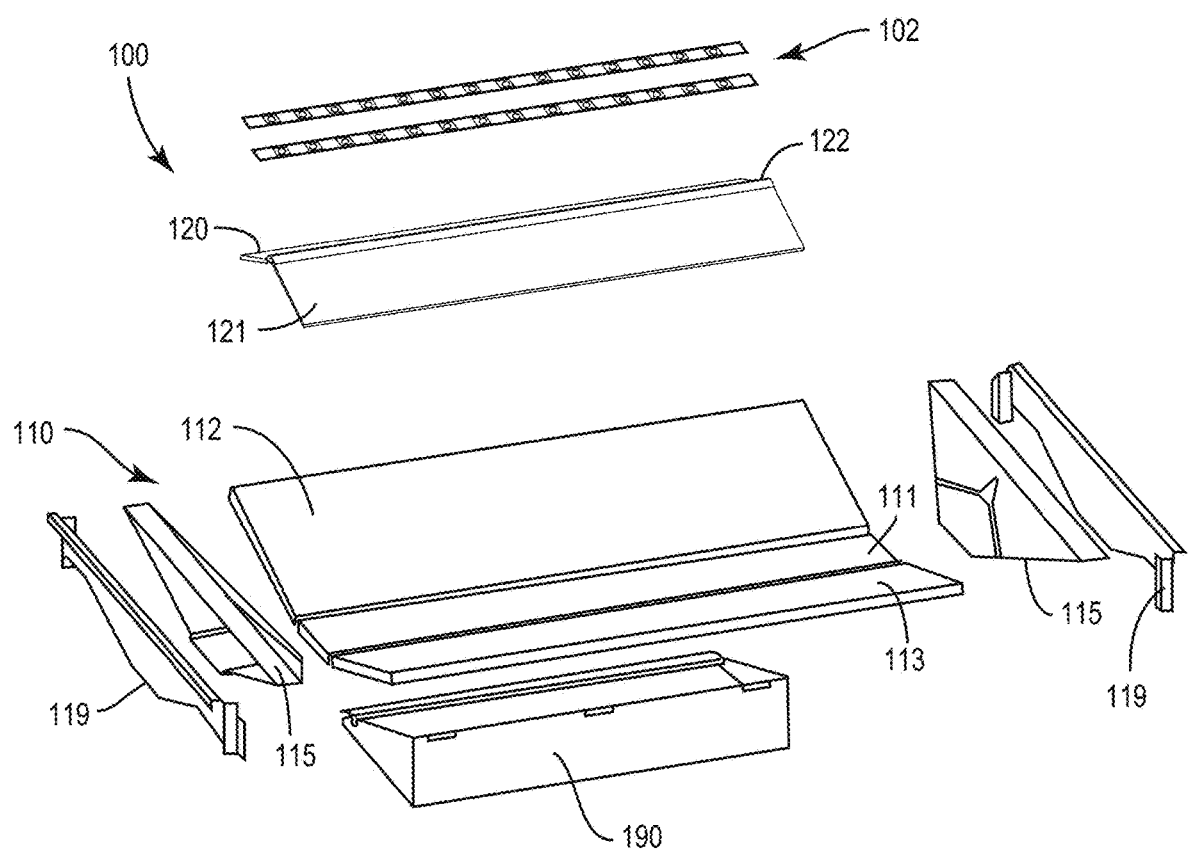
FIG. 3 is an exploded view of a light fixture.

As illustrated in FIG. 3, the housing 101 includes a back pan 110 with end caps 115 secured at each end. The back pan 110 and end caps 115 form a recessed pan style troffer housing. In one example, the back pan 110 includes three separate sections including a center section 111, a first wing 112, and a second wing 113. The back pan 110 includes a generally concave shape that opens outward towards the LED assembly 102. In one example, each of the center section 111, first wing 112, second wing 113, and end caps 115 are made of multiple sheet metal components secured together. In another example, the back pan 110 is made of a single piece of sheet material that is attached to the end caps 115. In another example, the back pan 110 and end caps 115 are made from a single piece of sheet metal formed into the desired shape. In examples with multiple pieces, the pieces are connected together in various manners, including but not limited to mechanical fasteners and welding. As illustrated in FIG. 3, outer support members 119 can extend over and are connected to the outer sides of the end caps 115. In another example, the housing 101 includes the back pan 110, but does not include end caps 115.

The exposed surfaces of the back pan 110 and end caps 115 may be made of or coated with a reflective metal, plastic, or white material. One suitable metal material to be used for the reflective surfaces of the panels is aluminum (Al). The reflective surfaces may also include diffusing components if desired. The reflective surfaces of the panels may comprise many different materials. For many indoor lighting applications, it is desirable to present a uniform, soft light source without unpleasant glare, color striping, or hot spots. Thus, the panels may comprise a diffuse white reflector, such as a microcellular polyethylene terephthalate (MC-PET) material or a DuPont/WhiteOptics material, for example. Other white diffuse reflective materials can also be used. The reflectors may also be aluminum with a diffuse white coating.

The light guide assembly 103 extends over the central longitudinal section of the housing 101. The light guide assembly 103 includes a pair of light guide plates 120, 121. The light guide plates 120, 121 are connected together along the centerline C/L by a connector 122. The connector 122 can also support the LED assembly 102 to position LED elements 133 along the sides of the light guide plats 120, 121.

Figure 2A:
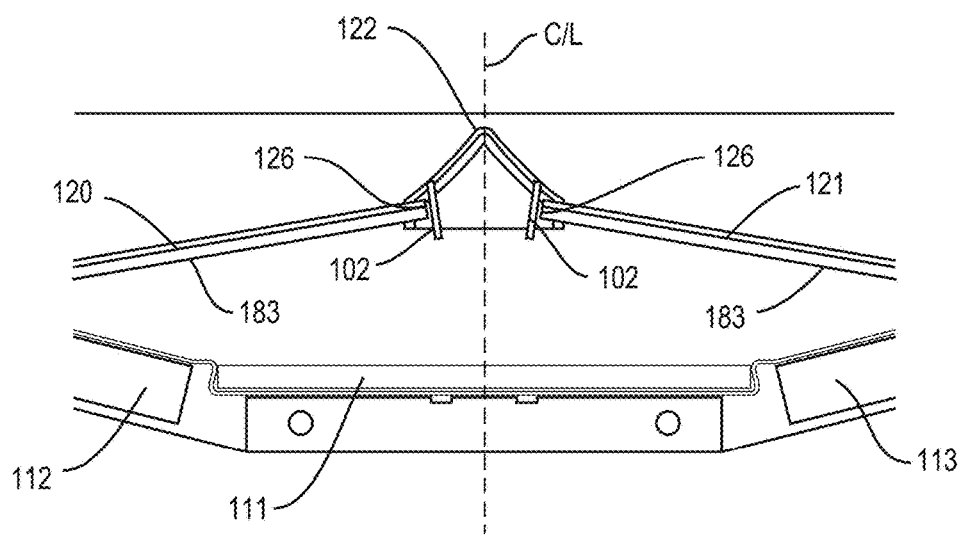
FIG. 2A is an enlarged view of the area marked in FIG. 2.
Figure 4:
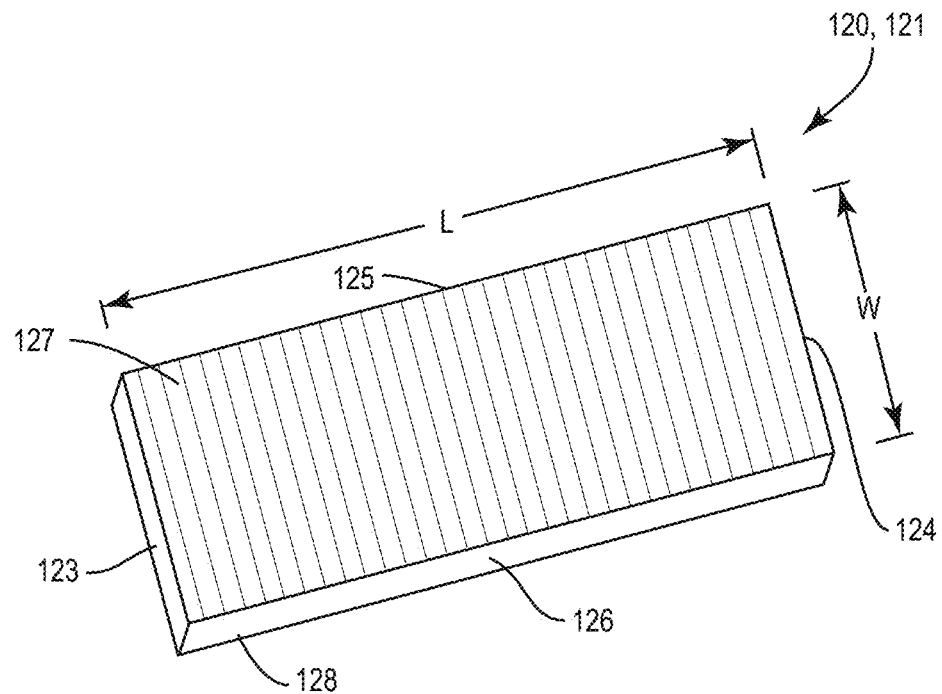
FIG. 4 is a schematic perspective view of a light guide plate.

As illustrated in FIG. 4, the light guide plates 120, 121 generally include outer edges that form a rectangular shape with opposing ends 123, 124, and opposing sides 125, 126. The light guide plates 120, 121 include a length L measured between the ends 123, 124. The length L can be substantially equal to the back pan 110 such that the ends 123, 124 abut against the end caps 115. In another example, the length L is less than the back pan 110 and one or both ends 123, 124 are spaced inward from the respective end caps 115. The sides 126 can be aligned towards the centerline C/L. As illustrated in FIG. 2A, the sides 126 are attached to the connector 122. In one example, the sides 126 are positioned in slots 129 in the connector 122. In one example, the opposing sides 125 abut against the back pan 110, and specifically against the first and second wings 112, 113 respectively. The sides 123,124 can be attached to the back pan 110, such as with mechanical connectors and/or adhesives. In another example, the sides 125 are spaced away from the back pan 110.

The light guide plates 120, 121 extend outward above the central section of the back pan 110. An enclosed interior space 191 is formed between the light guide plates 120, 121 and the housing 101. The ends of the interior space 191 can be enclosed by the end caps 115.

The light guide plates 120, 121 further include an outer surface 127 that faces away from the back pan 110, and an inner surface 128 that faces towards the back pan 110. The outer surface 127 and the inner surface 128 have different features to direct the light from the light fixture 100. A thickness of the light guide plates 120, 121 is measured between the outer surface 127 and the inner surface 128. The thickness can be consistent throughout, and in one example the thickness is about 3.0 mm. The thickness can also vary depending upon features on one or both of the outer face 127 and the inner face 128.

Figure 4A:
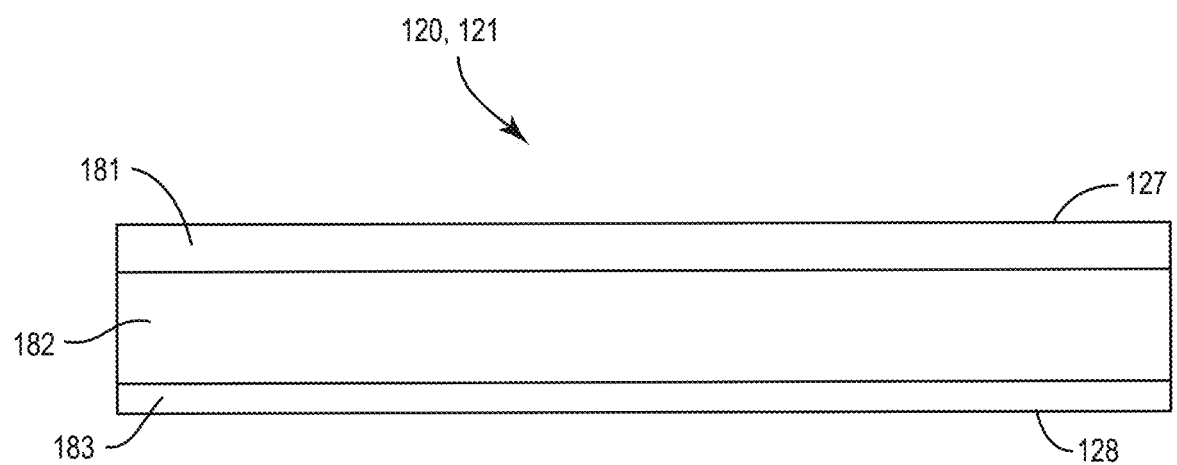
FIG. 4A is a side schematic view of a light guide plate that includes a diffuser layer, a plate layer, and a reflector layer.

FIG. 4A illustrates the details of the light guide plates 120, 121. The light guide plates 120, 121 are composed of three layers in the order: a diffuser 181 at the upper face 127, a plate 182, and a diffuse reflector 183 at the inner surface 128. In one example, the diffuser 181 is a diffuser film 181. The diffuser 181 softens and uniformly distributes light that is emitted from the light guide plate 120, 121. The plate collects light from one or more LED elements 133 that are positioned along one or more sides and redistributes the light through the upper surface 127 or outer surface. The diffuse reflector 183 reflects and recycles light that escapes from bottom surface of the plate 182 thus increasing the optical efficiency.

The light guide plates 120, 121 provides for scattered or reflected light to exit through the outer surface 127 or to reflect and propagate within the plate 182. The outgoing light extracts within a range of angles. This enables light to pass directionally through the wave guide plates 120, 121 thus contributing to uniform illumination.

FIGS. 5 and 5A illustrate one light guide plate 120, 121. LED assemblies 102 are positioned along one or both of sides 125, 126. The light guide plates 120, 121 include a series of elongated features 140 that extend the width W between the sides 125, 126. In one example as illustrated in FIG. 5, the features 140 have a uniform distribution with constant spacing across the outer surface 127. In one example, the features 140 are parallel with the ends 123, 124, and perpendicular to the sides 125, 126. FIG. 5A includes that each of the features 140 has a semi-circular ridge 141 that are separated by intervening valleys 142. The ridges 141 include a uniform shape with a fixed radius. In one example, each of the ridges 141 includes the same radius. In one example, each ridge 141 is a semicircle.

In one example, the features 140 are formed in the plate 182 and the diffuser 181 simply extends over the upper surface of the plate 182 where the plate 182 and the diffuser 181 are stacked. In one example, air gaps are formed at the cylindrical ridges of the features 140. In another example, both the plate 182 and diffuser 181 form the features 140. In another example, the features 140 are formed by the diffuser 181 with the upper surface of the plate 182 being substantially flat.

Figures 6, 6A:
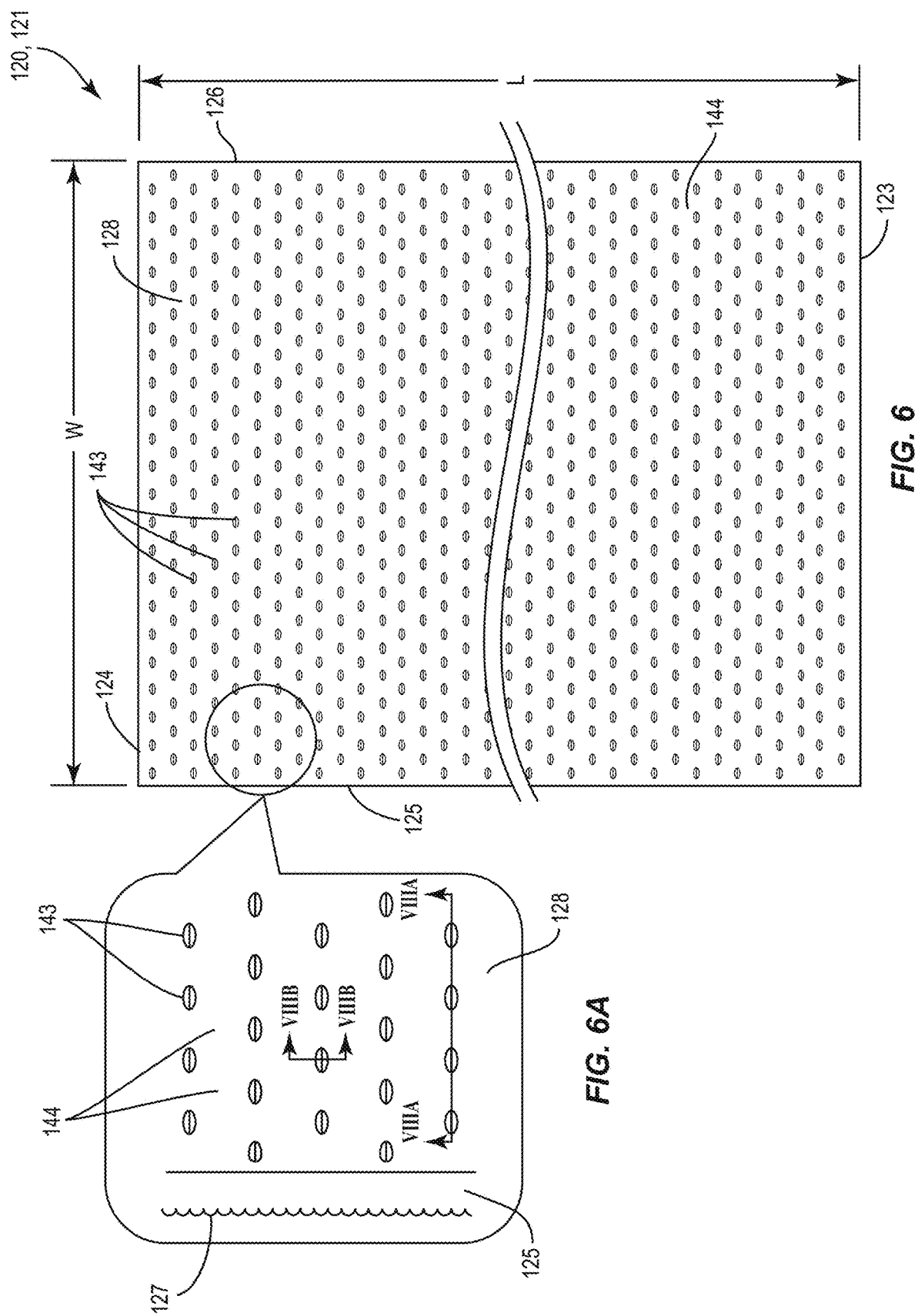
FIG. 6 is a bottom view of a light guide plate.
FIG. 6A is a schematic view of the light guide plate of FIG. 6.

FIGS. 6 and 6A illustrate a light guide plate 120, 121. Features 143 are formed in the planar lower surface 144 lower surface of the plate 182. The features 143 are configured for light to have total internal reflection (TIR) or be refracted. The light is directed towards the outer surface 127 in varied directions which provides for uniform light distribution. In one example, each of the features 143 includes the same shape and size. In another example, the features 143 include two or more different shapes and/or sizes.

Figure 7:
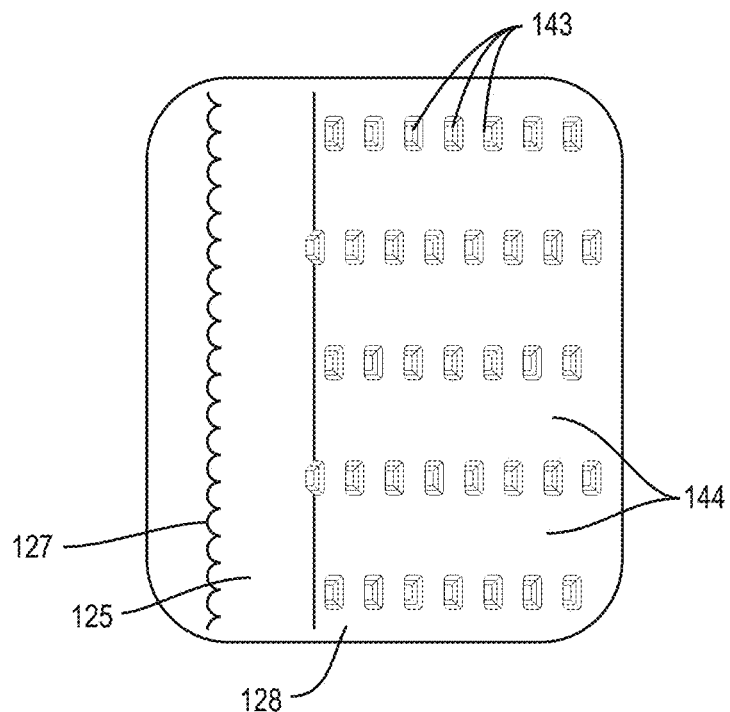
FIG. 7 is a schematic view of a bottom of a light guide plate.

In one example, the features 143 are aligned in a regular pattern with constant spacing. FIG. 6 includes a regular pattern with the features 143 aligned in rows across the width W with gaps positioned between each feature 143. Adjacent rows are offset with the features of one row aligned with the gaps of the adjacent rows. In another example as illustrated in FIG. 7, the features 143 are aligned in uniform rows and also aligned across the width. The features 143 can also be aligned in other regular patterns. In another example, the features 143 are arranged in an irregular pattern. In one example, the features 143 are arranged with a weighted factor for spacing. This includes the spacing gradually increasing or decreasing from a particular point or outer edge while being arranged regularly.

Figure 8:
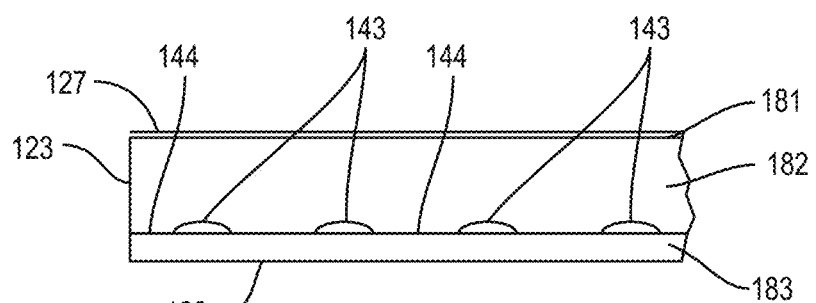
FIG. 8 is a schematic section view cut along line XIIIA-XIIIA of FIG. 6A.
Figure 8A:
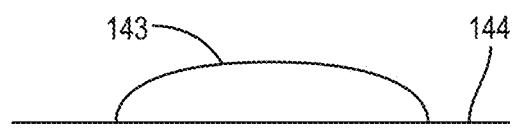
FIG. 8A is a schematic section view of a dip taken along an elongated axis cut along line XIIIA-XIIIA of FIG. 6A.
Figure 8B:
FIG. 8B is a schematic section view of the dip of FIG. 8A taken along a perpendicular axis cut along line XIIIB-XIIIB of FIG. 6A.

The features 143 include dips that extend into the lower surface 144 of the plate 182. The dips include an ellipsoidal shape in a first plane as illustrated in FIGS. 8 and 8A and a freeform shape in the crossed plane as illustrated in FIG. 8B. In one example as specifically included in FIG. 8B, the crossed plane includes a scooped shape. The dips include a major axis with the ellipsoidal shape and a minor axis with the freeform shape. The dips are arranged with the major axis of the ellipsoidal shape being perpendicular to the plane of the LED assembly 102. Using the example of FIG. 6, the major axis is perpendicular to one or both sides 125, 126 and the LED assembly 102 would be positioned along one or both of the sides 125, 126.

In another example, the features 143 include other shapes that are trapezoidal shape or other freeform shape in an axis either parallel or perpendicular to an LED assembly 102.

Figure 9:
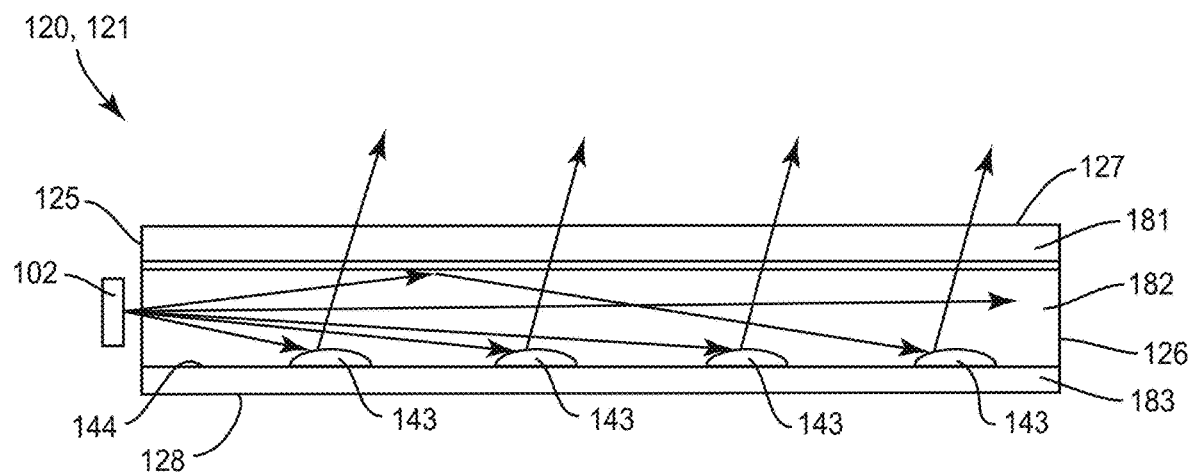
FIG. 9 is a schematic view of light rays reflecting within a light guide plate.

FIG. 9 illustrates light rays fan moving through a light guide plate 120, 121. Light rays from the light elements 133 of the LED assembly 102 enter into the plate 182. Some of the light rays hit the features 143 and then partially reflect to be emitted outward from the outer surface 127 or perimeter edges. Some of the light rays are refracted and guided inside the plate 182 until hitting another feature 143 and/or other spot on the light guide plate 120, 121. Some of the light rays hit directly against the top surface of the plate 182 and/or the diffuser 181 and are reflected and guided inside the plate 182 until hitting a feature 143 or surface. Some of the light rays propagate various distances through the plate 182 until hitting a feature 143 or perimeter edge. Some of the light rays hit the diffuse reflector 183 and are reflected into the plate 182.

Figure 9A:
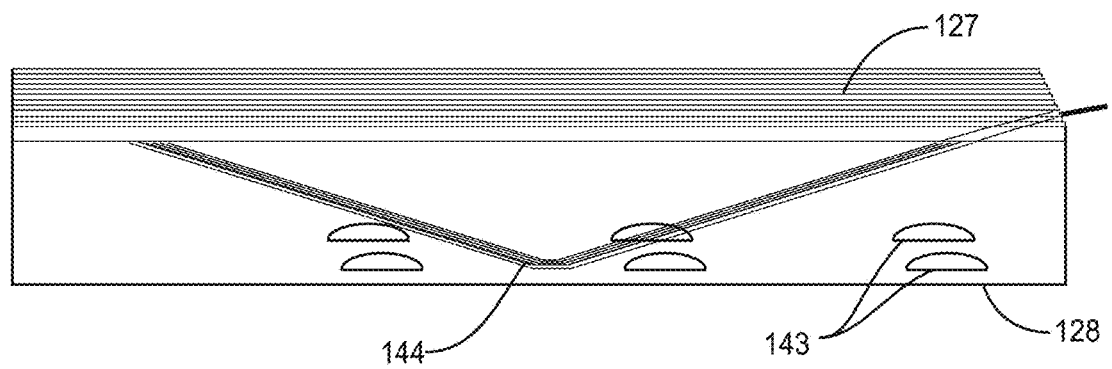
FIG. 9A is a schematic diagram of a light ray reflecting inside the plate from a planar surface of a light guide plate.
Figure 10:
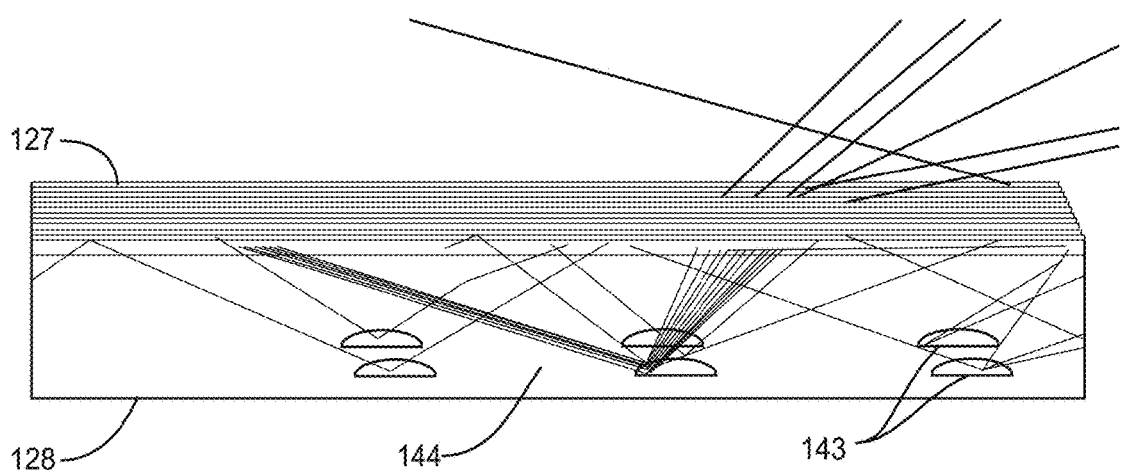
FIG. 10 is a schematic diagram of light rays reflecting inside the plate from a dip surface of a light guide plate.

FIG. 9A illustrates a light ray fan on the planar surface 144 that reflects by TIR in a normal manner. FIG. 10 illustrates light rays hitting the features 143. The light rays hitting the features 143 are TIR-reflected and go in varied directions. The varied surface curvatures of the features 143 scatter the light in different directions. In one example, the features 143 include ellipsoidal dips with the shape being elongated along the main LED light direction. This enables the light to propagate through the light guide plate 120,121 smoothly to the opposing side 125, 126 while going in varied directions upon contact with a feature 143. The freeform surface of the ellipsoidal shape in the opposing plane assists to extract the light uniformly onto the outer surface 127 and also to pass through the light guide plate 120, 121.

An LED assembly 102 is mounted to each of the first and second light guide plates 120, 121. In one example as illustrated in FIGS. 2 and 2A, the LED assemblies 102 are mounted to the side 126 of each of the light guide plates 120, 121. The LED assemblies 102 include LED elements 133 aligned in an elongated manner that extends along the light guide plates 125, 126.

Figure 11:
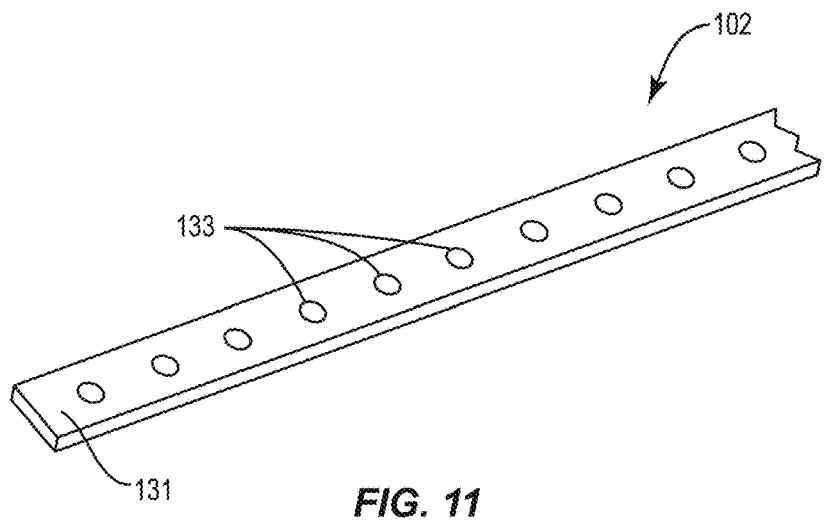
FIG. 11 is a schematic diagram of an LED assembly.
Figure 12:
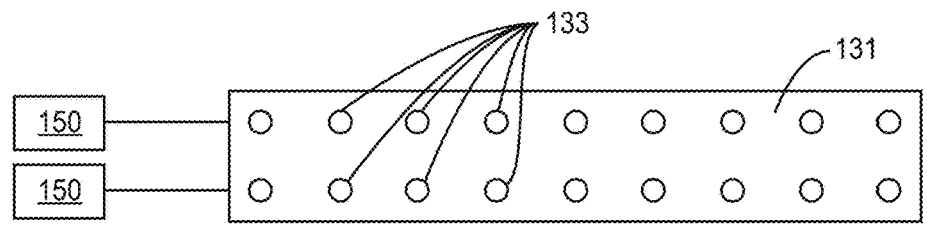
FIG. 12 is a schematic diagram of an LED assembly with a pair of driver circuits.

FIG. 11 illustrates an LED assembly 102 that includes the LED elements 133 and a substrate 131. The LED elements 133 can be arranged in a variety of different arrangements. In one example as illustrated in FIG. 11, the LED elements 133 are aligned in a single row. In another example as illustrated in FIG. 12, the LED elements 133 are aligned in two or more rows. The LED elements 133 can be arranged at various spacings. In one example, the LED elements 133 are equally spaced along the length of the light guide plates 120, 121. In another example, the LED elements 133 are arranged in clusters at different spacings along the light guide plates 120, 121. In one example, each LED element 133 has a size of about 1.0 mm in length and about 1.0 mm in width.

The LED assemblies 102 can include various LED elements 133. In the various examples, the LED assembly 102 can include the same or different LED elements 133. In one example, the multiple LED elements 133 are similarly colored (e.g., all warm white LED elements 133). In such an example all of the LED elements are intended to emit at a similar targeted wavelength; however, in practice there may be some variation in the emitted color of each of the LED elements 133 such that the LED elements 133 may be selected such that light emitted by the LED elements 133 is balanced such that the light fixture 100 emits light at the desired color point.

In one example, each LED element 133 is a single white or other color LED chip or other bare component. In another example, each LED element 133 includes multiple LEDs either mounted separately or together. In the various embodiments, the LED elements 133 can include, for example, at least one phosphor-coated LED either alone or in combination with at least one color LED, such as a green LED, a yellow LED, a red LED, etc.

In various examples, the LED elements 133 of similar and/or different colors may be selected to achieve a desired color point.

In one example, the LED assembly 102 includes different LED elements 133. Examples include blue-shifted-yellow LED elements ("BSY") and a single red LED elements ("R"). Once properly mixed the resultant output light will have a "warm white" appearance. Another example uses a series of clusters having three BSY LED elements 133 and a single red LED element 133. This scheme will also yield a warm white output when sufficiently mixed. Another example uses a series of clusters having two BSY LED elements 133 and two red LED elements 133. This scheme will also yield a warm white output when sufficiently mixed. In other examples, separate blue-shifted-yellow LED elements 133 and a green LED element 133 and/or blue-shifted-red LED element 133 and a green LED element 133 are used. Details of suitable arrangements of the LED elements 133 and electronics for use in the light fixture 100 are disclosed in U.S. Pat. No. 9,786,639, which is incorporated by reference herein in its entirety.

The substrate 131 supports and positions the LED elements 133. The substrate 131 can include various configurations, including but not limited to a printed circuit board and a flexible circuit board. The substrate 131 can include various shapes and sizes depending upon the number and arrangement of the LED elements 133.

Figure 13:
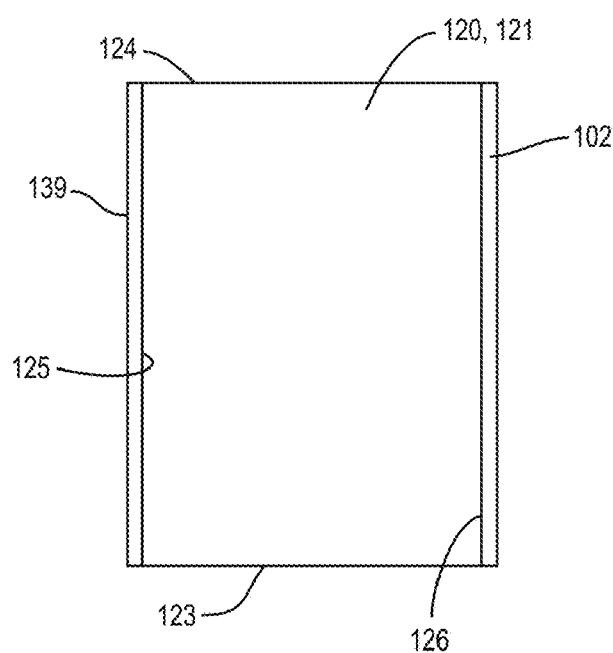
FIG. 13 is a schematic diagram of a light guide plate with an LED assembly attached to a first side and a reflector attached to an opposing side.

In one example, an LED assembly 102 is attached to light guide plates 120, 121 along one of the sides 125, 126, or ends 123, 124. In one example, the LED assembly 102 is connected to one of the sides 125, 126, such as side 126 as illustrated in FIG. 13. The LED assembly 102 extends the length of the light guide plate 120, 121.

A reflector 139 is attached to the opposing side 125, 126 (e.g., side 125 in FIG. 13). Various types of reflectors 129 can be used, such as but not limited to a WHITEOPTIC reflector from WhiteOptics, LLC, or a high reflecting film or material. In one example, the reflector 129 is configured to transmit about 50% of the light and to reflect about 50% of the light. In another example, the reflector 129 reflects 100% of the light. In another example, the opposing side 125, 126 does not include a reflector 129.

In one example, the LED assembly 102 and reflector 129 guide the light and the ends 123, 124 do not include optics. In one example, one or both ends 123, 124 can be flat and polished.

In one example as illustrated in FIG. 13, a single LED assembly 102 is attached to each light guide plate 120, 121. In another example, two or more LED assemblies 102 are attached to each light guide plate 120, 121. For example, LED assemblies 102 are attached to both of the sides 125, 126, to one of the sides 125, 126 and one of the ends 123, 124, or to both of the ends 123, 124.

In one example, the light guide plates 120, 121 are the same and each includes the same arrangement of one or more LED assemblies 102. This provides for uniform light distribution throughout the light fixture 100. In another example, the light guide plates 120, 121 are different and/or include different arrangements of the one or more LED assemblies 102.

Each LED element 133 receives power from an LED driver circuit or power supply of suitable type, such as a SEPIC-type power converter and/or other power conversion circuits. At the most basic level a driver circuit 150 may comprise an AC to DC converter, a DC to DC converter, or both. In one example, the driver circuit 150 comprises an AC to DC converter and a DC to DC converter. In another example, the AC to DC conversion is done remotely (i.e., outside the fixture), and the DC to DC conversion is done at the driver circuit 150 locally at the light fixture 100. In yet another example, only AC to DC conversion is done at the driver circuit 150 at the light fixture 100. Some of the electronic circuitry for powering the LED elements 133 such as the driver and power supply and other control circuitry may be contained as part of the LED assembly 102 or the lamp electronics may be supported separately from the LED assembly 102.

In one example, a single driver circuit 150 is operatively connected to each of the LED elements 133. In another example as illustrated in FIG. 12, two or more driver circuits 150 are connected to the LED elements 133.

In one example, the LED assemblies 102 are each mounted on a heat sink that transfers away heat generated by the one or more LED elements 133. The heat sink provides a surface that contacts against and supports the substrate 131. The heat sink further includes one or more fins for dissipating the heat. The heat sink 132 cools the one or more LED elements 133 allowing for operation at desired temperature levels.

As illustrated in FIG. 3, a control box 190 is attached to the housing 101. In one example as illustrated in FIG. 3, the control box 190 is attached to the underside of the second wing 113. The control box 190 can also be positioned at other locations. The control box 190 extends around and forms an enclosed interior space configured to shield and isolate various electrical components. In one example, one or more driver circuits 150 are housed within the control box 190. Electronic components within the control box 190 may be shielded and isolated.

Examples of troffer light fixtures with a housing and LED assembly are disclosed in U.S. Pat. Nos. 10,508,794, 10,247,372, and 10,203,088, each of which is hereby incorporated by reference in its entirety.

Illumination testing was performed on three separate lighting fixtures 100. Each light fixture 100 included the same housing 101 and with the same LED assembly 102 attached to the side 126 of each light guide plate 120, 121 as illustrated in FIGS. 2 and 2A. A first light fixture 100 included no reflector 129 on the opposing side 125. A second light fixture 100 included a reflector 129 attached to the side 125 with the reflector 129 configured to reflect 50% of the light and to transmit 50% of the light. A third light fixture 100 included a reflector 129 attached to the side 125 with the reflector 129 configured to reflect 100% of the light. FIGS. 14A, 14B, 14C, and 14D illustrate the first light fixture 100. FIGS. 15A, 15B, 15C, and 15D illustrate the second light fixture 100. FIGS. 16A, 16B, 16C, and 16D illustrate the third light fixture 100.

Figure 14A:
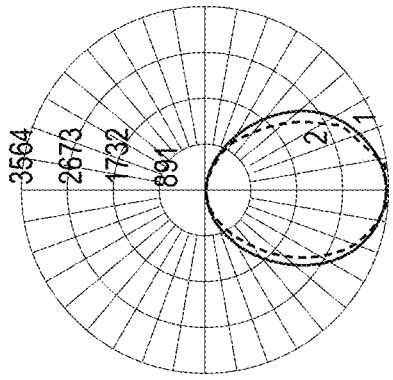
FIG. 14A is an exemplary representation of a simulated candela plot achieved with a first light fixture.
Figure 15A:
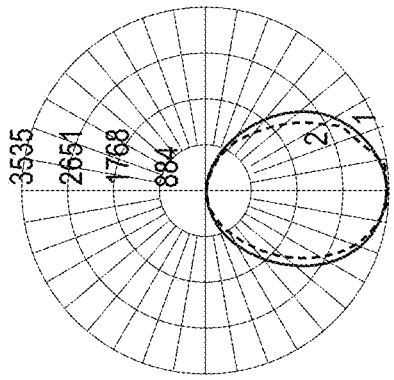
FIG. 15A is an exemplary representation of a simulated candela plot achieved with a second light fixture.
Figure 16A:
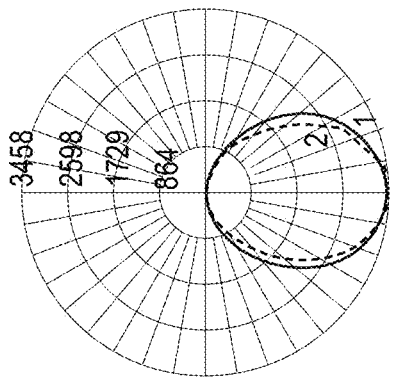
FIG. 16A is an exemplary representation of a simulated candela plot achieved with a third light fixture.

Each of FIGS. 14A, 15A, and 16A illustrate two separate plots. The first plot 1 illustrates the intensity curve over vertical angles on the plane perpendicular to the longitudinal axis A (see FIG. 1). The second plot 2 is the intensity curve on the vertical angles on the plane (parallel plane) along the longitudinal axis A.

A spacing criterion (SC) was also calculated for each light fixture 100. The SC shows how much light can be distributed widely to make uniform at a given mounting height (i.e., it is the ratio of luminaires spacing to mounting height). The SC was measured along each of the longitudinal axis, perpendicular axis, and in a diagonal direction. For the first light fixture 100 (with no reflecting optic), the SC in along the longitudinal axis was 1.12, the SC in the perpendicular axis was 1.20, and the SC in the diagonal direction was 1.26. For the second light fixture 100 (with the reflector 129 being 50% transmissive and 50% reflective), the SC along the longitudinal axis was 1.12, the SC in the perpendicular axis was 1.20, and the SC in the diagonal direction was 1.28. For the third light fixture 100 (with the reflector 129 being 100% reflective), the SC in along the longitudinal axis was 1.12, the SC in the perpendicular axis was 1.81, and the SC in the diagonal direction was 1.26.

Figure 14B:
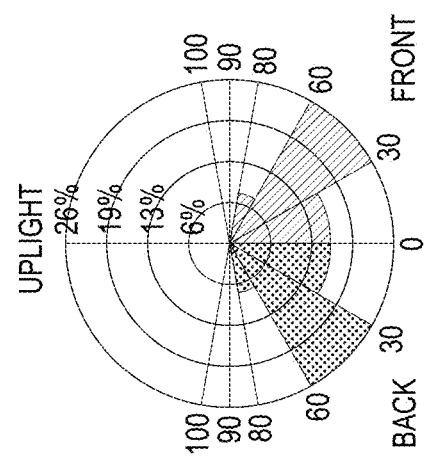
FIG. 14B illustrates luminous flux distribution patterns for a first light fixture.
Figure 15B:
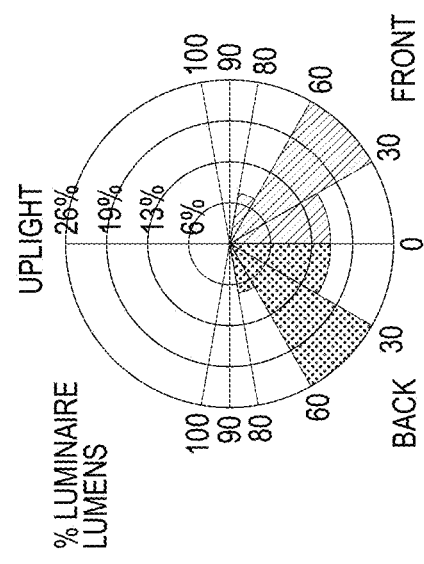
FIG. 15B illustrates luminous flux distribution patterns for a second light fixture.
Figure 16B:
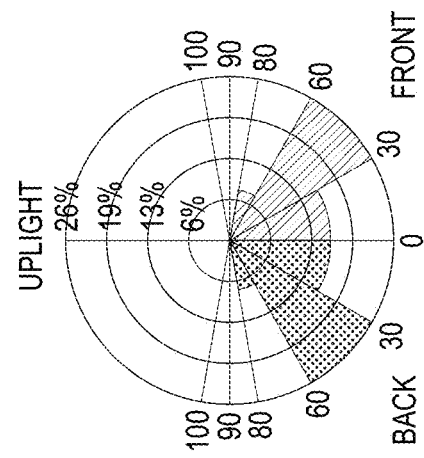
FIG. 16B illustrates luminous flux distribution patterns for a third light fixture.

FIGS. 14B, 15B, and 16B illustrate the Luminaire Classification System (LCS). The LCS illustrates lumens distribution over angles as % of total fixture lumens. Each of the light fixtures 100 was measured for FL is front low (angle), FM is front medium angle, FH is front high angle, FVH is front very high angle, BL is back low angle, BM is back medium angle, BH is back high angle, UL is uplight low angle, and UH is uplight high angle. For these measurement, low is between 0-30°, medium is between 30-60°, high is between 60-80°, and very high is between 80-90°, uplight low is between 90-100°, and uplight high is between 100-180°.

The first light fixture 100 without reflecting optics (FIG. 14B) includes the following: FL=15.8%; FM=25.8%; FH=7.9%; FVH=0.5%; BL=15.8%; BM=25.8%; BH=7.9%; BVH=0.5%; UL=0.0%; and UH=0.0%.

The second light fixture 100 with the reflector 129 that is 50% transmissive and 50% reflective includes the following: FL=15.7%; FM=25.8%; FH=7.9%; FVH=0.5%; BL=15.7%; BM=25.8%; BH=7.9%; BVH=0.5%; UL=0.0%; and UH=0.0%.

The third light fixture 100 with the reflector 129 that is 100% reflective includes the following: FL=15.9%; FM=25.8%; FH=7.8%; FVH=0.6%; BL=15.9%; BM=25.7%; BH=7.8%; BVH=0.6%; UL=0.0%; and UH=0.0%.

The optical efficiency of three light fixtures 100 can range from between about 75%-80%.

Figure 14C:
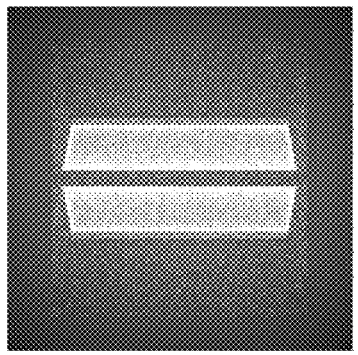
FIG. 14C are luminance appearance and luminance uniformity from the front view of the first light fixture.
Figure 15C:
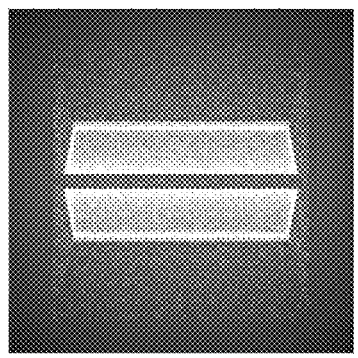
FIG. 15C are luminance appearance and luminance uniformity from the front view of the second light fixture.
Figure 16C:
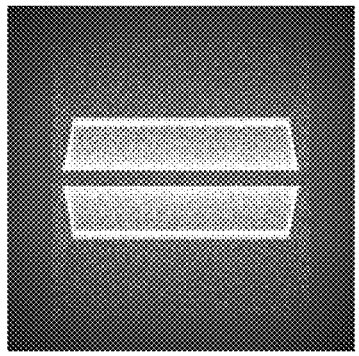
FIG. 16C are luminance appearance and luminance uniformity from the front view of the third light fixture.

FIGS. 14C, 15C, and 16C demonstrate the luminance appearance from a front view.

Figure 14D:
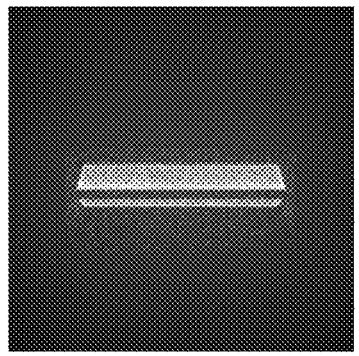
FIG. 14D are luminance appearance and luminance uniformity from a 65° angle relative to a centerline of the first light fixture.
Figure 15D:
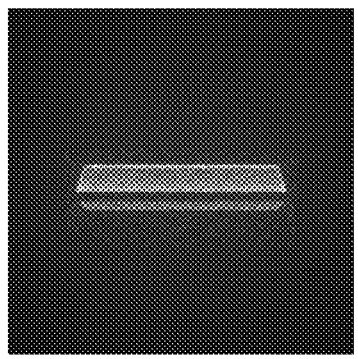
FIG. 15D are luminance appearance and luminance uniformity from a 65° angle relative to a centerline of the second light fixture.
Figure 16D:
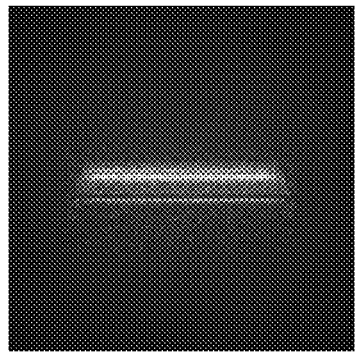
FIG. 16D are luminance appearance and luminance uniformity from a 65° angle relative to a centerline of the third light fixture.

FIGS. 14D, 15D, and 16D demonstrate the luminance appearance from an angle of 65 degrees relative to the centerline.

Figure 17:
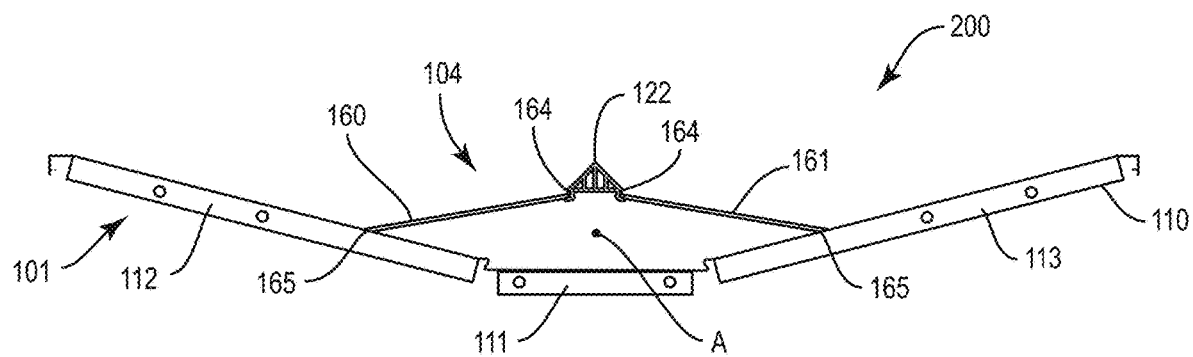
FIG. 17 is a side schematic view of a light fixture having a housing and a light panel assembly.
Figure 17A:
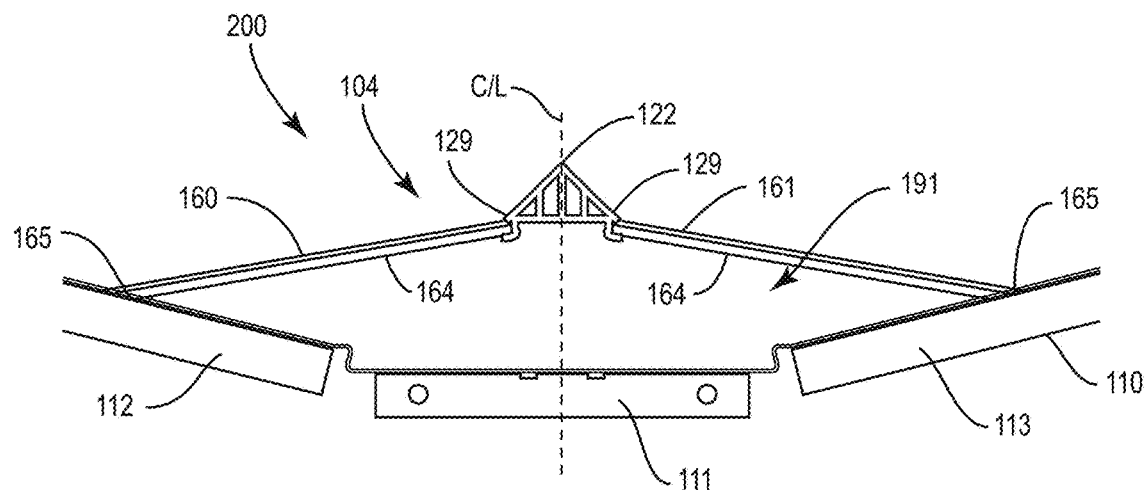
FIG. 17A is an enlarged view of the area marked in FIG. 17.

FIGS. 17 and 17A disclose another light fixture 200 with a troffer design. The light fixture 200 includes a housing 101 as described above for light fixture 100. The light fixture 200 includes a longitudinal axis A that extends along the length. The light fixture 200 can have various shapes and sizes, including standard troffer fixture sizes, such as but not limited to 2 feet by 4 feet (2'×4'), 1 foot by 4 feet (1'×4'), or 2 feet by 2 feet (2'×2'). However, it is understood that the elements of the light fixture 100 may have different dimensions and can be customized to fit most any desired fixture dimension.

Figure 19:
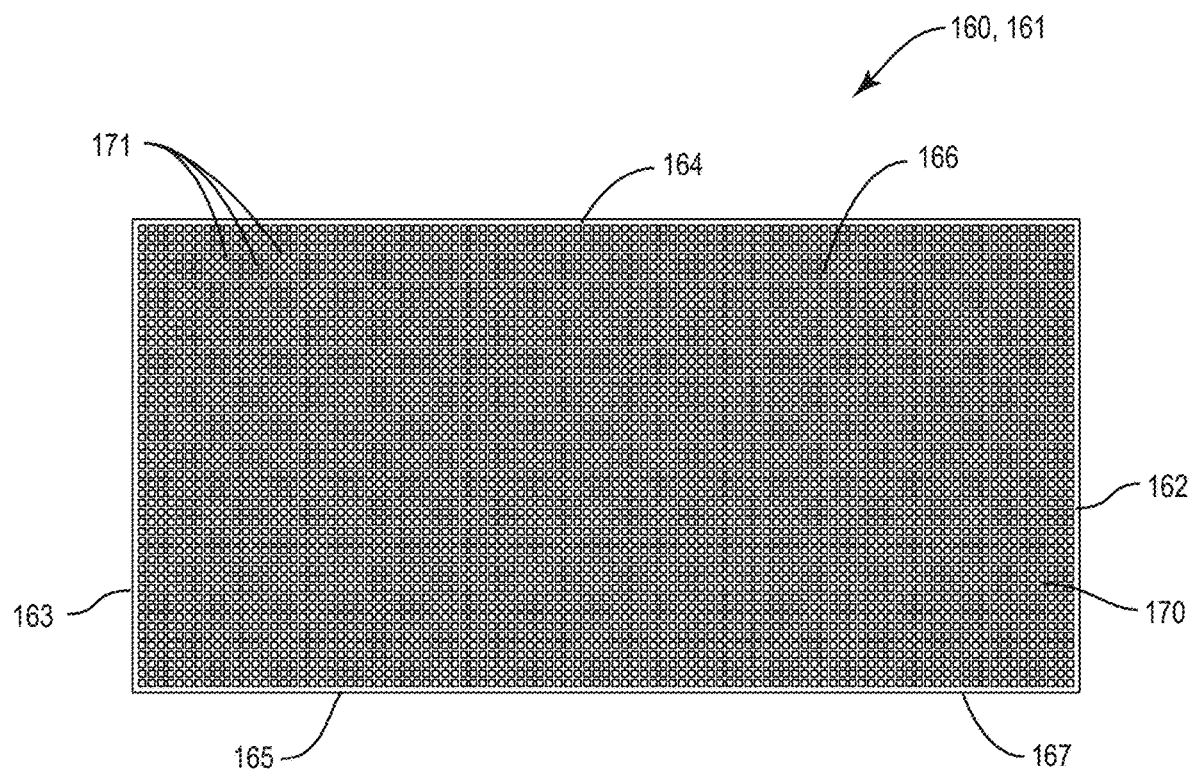
FIG. 19 is a top view of a light panel with an array of pixels.

A light panel assembly 104 extends over the central section of housing 101. The light panel assembly 104 includes first and second light panels 160, 161. As illustrated in FIG. 19, the light panels 160, 161 have a substantially rectangular shape with opposing ends 162, 163, and opposing lateral sides 164, 165. In one example, the light panels 160, 161 extend the length of the back pan 110 with the ends 162, 163 contacting against each of the opposing end caps 115. In another example, one or both ends 162, 163 are spaced away from the end caps 115. The inner lateral sides 164 are connected to the connector 122 that is aligned along the centerline C/L. In one example, the connector 122 includes slots 129 that receive the lateral sides 164.

The outer lateral sides 165 are positioned towards the back pan 110. In one example, the lateral sides 165 contact against the back pan 110, with the lateral sides 165 contacting against the first wing 112 and the second wing 113, respectively. In one example, the lateral sides 165 are attached to the back pan 100, such as with one or more adhesives and mechanical fasteners.

The light panel assembly 104 extends across the central section of the housing 101. An enclosed interior space 191 is formed between the light panel assembly 104 and the housing 100. The ends of the interior space 191 can be enclosed by the end caps 115.

Figure 18:
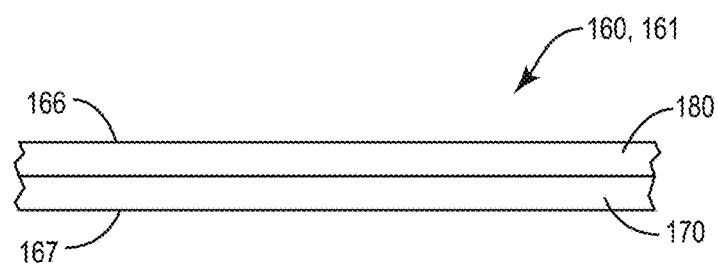
FIG. 18 is a partial schematic side view of a light panel.

As illustrated in FIG. 18, the light panels 160, 161 include a light assembly 170 and a protective film 180. The light assembly 170 is positioned at an inner side 167 of the light panels 160, 161, and the film 180 is positioned at an outer side 166. The light panels 160, 161 comprise a relatively thin, flat shape.

Figure 20:
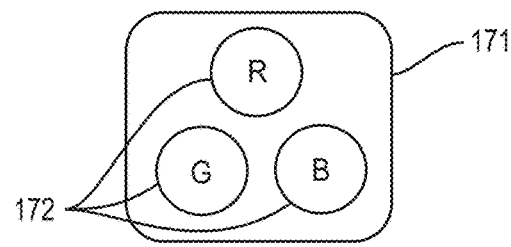
FIG. 20 is a schematic diagram of a pixel having multiple sub-pixels.

As illustrated in FIG. 19, the light assembly 170 includes an array of pixels 171 that face outward away from the housing 101. The array can include various sizes and shapes. As illustrated in FIG. 20, each pixel 171 includes multiple sub-pixels 172. In one design, each pixel 171 includes three sub-pixels 172: a red sub-pixel 172; a green sub-pixel 172; and a blue sub-pixel 172 (i.e., an RGB pixel). The sub-pixels 172 can be adjusted to different luminance values to cause the pixels 171 to have various colors.

In another example, each pixel 171 is a single pixel that provide a single uniform light. In one example, the single pixel gives uniform lighting with a single white color.

In one example, the sub-pixels 172 are microscopic LEDs that have a size of between about 1-10 µm. The pixels 171 and sub-pixels 172 can also include other lighting technologies, including liquid crystal display (LCD), organic LED (OLED), and quantum dots (QD).

The film 180 is positioned over the light assembly 170 (i.e., on the side of the light assembly 170 away from the assembly 101). The film 180 protects the light assembly 170 from environmental conditions such as humidity and from mechanical deformation.

Figure 21:
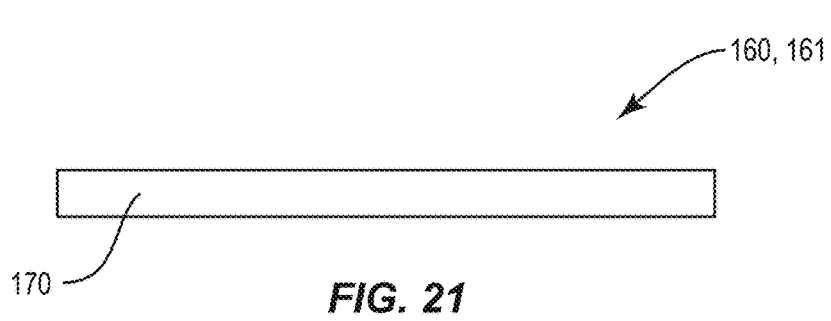
FIG. 21 is a schematic side view of a light panel.

In another example as illustrated in FIG. 21, the light panels 160, 161 include just a light assembly 170 without a film 180. In one example, a protecting member is integral formed within the light assembly 170. The light panels 160, 161 do not require extra diffusers because the array of pixels 171 is a diffused light source having uniform luminance.

In one example, the light assemblies 170 include a heat sink mounted on the inner side towards the housing 101.

Figure 22:
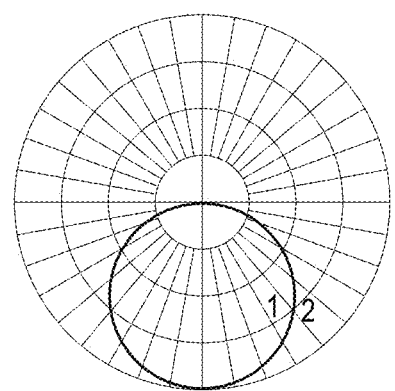
FIG. 22 is an exemplary representation of a simulated candela plot achieved with a light fixture.

FIG. 22 illustrates plots 1, 2 of the intensity curve of the light fixture 200. The first plot 1 illustrates the intensity curve over vertical angles on the plane perpendicular to the longitudinal axis A. The second plot 2 is the intensity curve on the v-angles on the plane perpendicular to the longitudinal axis A. The light fixture 200 further includes a Spacing Criterion along the longitudinal axis and perpendicular axis of 1.3, and along the diagonal of 1.42, along with good Lambertian distribution.

FIG. 23 illustrates the Luminaire Classification System of lumens distribution over angles as % of total fixture lumens. The light fixture includes the following: FL=13.1%; FM=25.9%; FH=10.2%; FVH=1.0%; BL=13.1%; BM=25.9%; BH=10.2%; BVH=0.8%; UL=0.0%; and UH=0.0%.

In the various examples, the light fixtures 100, 200 can include one or more communication components forming a part of the light control circuitry, such as an RF antenna that senses RF energy. The communication components may be included, for example, to allow the light fixture 100 to communicate with other light fixtures 100 and/or with an external wireless controller. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such a sensor may be integrated into the light control circuitry. In various embodiments described herein various smart technologies may be incorporated in the lamps as described in the following United States patent applications "Solid State Lighting Switches and Fixtures Providing Selectively Linked Dimming and Color Control and Methods of Operating," application Ser. No. 13/295,609, filed Nov. 14, 2011, now U.S. Pat. No. 8,736,186, which is incorporated by reference herein in its entirety; "Master/Slave Arrangement for Lighting Fixture Modules," application Ser. No. 13/782,096, filed Mar. 1, 2013, now U.S. Pat. No. 9,572,226, which is incorporated by reference herein in its entirety; "Lighting Fixture for Automated Grouping," application Ser. No. 13/782,022, filed Mar. 1, 2013, now U.S. Pat. No. 9,155,165, which is incorporated by reference herein in its entirety; "Lighting Fixture for Distributed Control," application Ser. No. 13/782,040, filed Mar. 1, 2013, now U.S. Pat. No. 8,975,827, which is incorporated by reference herein in its entirety; "Efficient Routing Tables for Lighting Networks," application Ser. No. 13/782,053, filed Mar. 1, 2013, now U.S. Pat. No. 9,155,166, which is incorporated by reference herein in its entirety; "Handheld Device for Communicating with Lighting Fixtures," application Ser. No. 13/782,068, filed Mar. 1, 2013, now U.S. Pat. No. 9,433,061, which is incorporated by reference herein in its entirety; "Auto Commissioning Lighting Fixture," application Ser. No. 13/782,078, filed Mar. 1, 2013, now U.S. Pat. No. 8,829,821, which is incorporated by reference herein in its entirety; "Commissioning for a Lighting Network," application Ser. No. 13/782,131, filed Mar. 1, 2013, now U.S. Pat. No. 8,912,735, which is incorporated by reference herein in its entirety; "Ambient Light Monitoring in a Lighting Fixture," application Ser. No. 13/838,398, filed Mar. 15, 2013, now U.S. Pat. No. 10,161,612, which is incorporated by reference herein in its entirety; "System, Devices and Methods for Controlling One or More Lights," application Ser. No.

14/052,336, filed Oct. 11, 2013, now U.S. Pat. No. 9,622, 321, which is incorporated by reference herein in its entirety; and "Enhanced Network Lighting," Application No. 61/932, 058, filed Jan. 27, 2014, which is incorporated by reference herein in its entirety. Additionally, any of the light fixtures described herein can include the smart lighting control technologies disclosed in U.S. Provisional Application Ser. No. 62/292,528, titled "Distributed Lighting Network", filed on Feb. 8, 2016 and assigned to the same assignee as the present application, the entirety of this application being incorporated by reference herein.

In various examples described herein various Circadian-rhythm related technologies may be incorporated in the light fixtures as described in the following: U.S. Pat. Nos. 8,310, 143, 10,278,250, 10,412,809, 10,529,900, 10,465,869, 10,451,229, 9,900,957, and 10,502,374, each of which is incorporated by reference herein in its entirety.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A light fixture comprising:
   a back pan;
   light guide assembly spaced away from and positioned over the back pan, the light guide assembly comprising first and second light guide plates that each include outer edges, an outer face that faces away from the back pan, and an inner face that faces towards the back pan, the first and second light guide plates connected together along the outer edges; and
   a first LED assembly that extends along one of the outer edges of the first light guide plate and a second LED assembly that extends along one of the outer edges of the second light guide plate, each of the first and second LED assemblies comprising LED elements that are aligned in an elongated array to emit light into the respective first and second light guide plates;
   each of the first and second light guide plates configured to receive the light through the outer edge and to direct the light outward from the outer surface and away from the back pan.

2. The light fixture of claim 1, wherein the inner faces of the first and second light guide plates each comprise an array of dips having an elongated shape with a major axis that is perpendicular to the respective first and second LED assemblies and a minor axis that is parallel with the respective first and second LED assembly.

3. The light fixture of claim 2, wherein each of the inner faces further comprise a planar surface with the dips extending into the planar surface.

4. The light fixture of claim 2, wherein the outer faces of the first and second light guide plates each comprise elongated features that extend a length and are perpendicular to the respective first and second LED assemblies.

5. The light fixture of claim 4, wherein the elongated features comprise ridges that each has a semi-spherical shape.

6. The light fixture of claim 1, wherein the inner faces of the first and second light guide plates each comprise first features that cause diffuse reflection of the light and second features that cause specular reflection of the light.

7. The light fixture of claim 1, wherein the LED assemblies are attached to first ones of the outer edges of the respective first and second light guide plates, and opposing second outer edges of the respective first and second light guide plates each comprise a reflector that reflects at least a portion of the light.

8. The light fixture of claim 1, wherein the inner faces of the first and second light guide plates are configured for total internal reflection of the light.

9. The light fixture of claim 1, further comprising a connector that connects together the first and second light guide plates, the connector comprising a body with slots that receives the outer edges of the first and second light guide plates, and with the connector positioned along a center line of the back pan.

10. The light fixture of claim 1, further comprising a diffuser film positioned on the outer faces of the first and second light guide plates and a diffuse reflector positioned on the inner faces of the first and second light guide plates.

11. The light fixture of claim 1, wherein the light fixture comprises a symmetrical shape about a center line of the light fixture.

12. A light fixture comprising:
    a concave back pan;
    first and second light guide plates that each include inner sides that are connected together and opposing outer sides that contact against opposing sections of the back pan, the first and second light guide plates further comprising an outer face that faces away from the back pan and an inner face that faces towards the back pan;
    a first LED assembly connected to the inner side of the first light guide plate and configured to direct light into the first light guide plate through the inner side; and
    a second LED assembly connected to the inner side of the second light guide plate and configured to direct light into the second light guide plate through the inner side;
    each of the first and second light guide plates configured to receive the light through the inner side and to direct the light outward from the outer face.

13. The light fixture of claim 12, wherein each of the first and second LED assemblies comprises LED elements that are aligned in an elongated array that extends a length of the inner side of the respective first and second light guide plates.

14. The light fixture of claim 12, wherein the inner face of each of the first and second light guide plates is configured for total internal reflection of the light.

15. The light fixture of claim 12, wherein the inner face of each of the first and second light guide plates comprises a planar face with an array of dips that extend into the planar face.

16. The light fixture of claim 15, wherein each of the dips comprises an elongated shape with a major axis that is perpendicular to the respective first and second LED assemblies.

17. The light fixture of claim 12, wherein each of the outer sides of the first and second light guide plates comprises a reflector that reflects at least a portion of the light back into the respective light guide plate.

18. The light fixture of claim 12, further comprising a connector that connects together the inner sides of each of the first and second light guide plates and wherein the connector further supports the first and second LED assemblies.

19. The light fixture of claim 12, further comprising a reflector positioned on the inner faces of the first and second light guide plates.

20. The light fixture of claim 19, further comprising a diffuser positioned on the outer faces of the first and second light guide plates.

21. A light fixture comprising:
   a housing comprising a concave back pan;
   first and second light panels that are connected together along outer edges and are positioned above and spaced away from the back pan, the first and second light panels further comprising an outer face that faces away from the back pan and an inner face that faces towards the back pan; and
   pixels that extend across the outer faces of each of the first and second light panels with each of the pixels configured to emit light.

22. The light fixture of claim 21, wherein each of the pixels comprises three sub-pixels that include a red sub-pixel, a blue sub-pixel, and a green sub-pixel.

23. The light fixture of claim 21, wherein each of the pixels comprises a single pixel that provides uniform lighting with single white color.

* * * * *